United States Patent
Chen et al.

(10) Patent No.: US 7,967,451 B2
(45) Date of Patent: Jun. 28, 2011

(54) MULTI-DIRECTIONAL IMAGE DISPLAYING DEVICE

(75) Inventors: Billy P. Chen, Bellevue, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 399 days.

(21) Appl. No.: 12/163,565

(22) Filed: Jun. 27, 2008

(65) Prior Publication Data

US 2009/0323029 A1    Dec. 31, 2009

(51) Int. Cl.
G03B 21/14    (2006.01)
(52) U.S. Cl. .............................. 353/98; 353/50; 353/119
(58) Field of Classification Search .................... 353/30, 353/37, 50, 51, 98, 99, 119
See application file for complete search history.

(56) References Cited

U.S. PATENT DOCUMENTS

| | | | |
|---|---|---|---|
| 4,943,851 A | 7/1990 | Lang | |
| 6,304,285 B1 | 10/2001 | Geng | |
| 6,552,699 B2 | 4/2003 | Dugdale | |
| 6,665,985 B1 | 12/2003 | Hennes | |
| 6,744,569 B2 * | 6/2004 | Geng | 359/725 |
| 6,803,928 B2 | 10/2004 | Bimber | |
| 6,856,472 B2 * | 2/2005 | Herman et al. | 359/725 |
| 7,134,756 B2 | 11/2006 | Drucker | |
| 7,173,605 B2 | 2/2007 | Fong | |
| 7,298,392 B2 | 11/2007 | Cutler | |
| 2003/0076423 A1 | 4/2003 | Dolgoff | |
| 2007/0035670 A1 | 2/2007 | Prior | |
| 2007/0058140 A1 * | 3/2007 | Kobayashi et al. | 353/94 |

FOREIGN PATENT DOCUMENTS

JP    2007218945 A  *  8/2007

OTHER PUBLICATIONS

"The Interactive Dome Project," Warp Ream Delta, Carnegie Mellon University Entertainment Technology Center, Spring 2004, 2 pp.
Alexei A. Efros et al., "Texture Synthesis by Non-parametric Sampling," IEEE International Conference on Computer Vision, Corfu, Greece, Sep. 1999, 6 pp.
Greg Welch et al., "Projected Imagery in Your 'Office of the Future,'" IEE Computer Grahpics and Applications, IEEE, Jul./Aug. 2000, pp. 62-67.
"Products and Services: Spherical Vision Products: Ladybug 2," 2007 Point Grey Research, Inc., 2 pp.
"The Magic Planet," 2007 Global Imagination, 2 pp.
Ramesh Raskar et al., "The Office of the Future: A Unified Approach to Image-Based Modeling and Spatially Immersive Displays," Computer Graphics Proceedings, Annual Conference Series, Orlando, Florida, Jul. 19-24, 1998, pp. 1-10.
"Fakespace Systems," a Mechdyne Company, 2007 Fakespace Systems, Inc., 1 p.

* cited by examiner

*Primary Examiner* — Kevin Pyo
(74) *Attorney, Agent, or Firm* — Shook, Hardy & Bacon LLP

(57) ABSTRACT

Methods, devices, and systems are provided for displaying an image using a multi-directional image displaying device in a compact, configurable device having an expansive viewing angle. An image projector projects an image having a plurality of image pixels. A distribution object is aligned with the image projector. The distribution object is utilized to redirect the image pixels projected by the image projector onto one or more display surfaces. As such, in one embodiment, a wide view display of the first image that expands at least the width of a user field of view results from the spreading of the image pixels. A compact housing unit provides support for the image projector and the distribution object. In one embodiment, the multi-directional image displaying device can be adjusted to change the wide view display of the image.

17 Claims, 12 Drawing Sheets

MULTI-DIRECTIONAL IMAGE DISPLAYING DEVICE

BACKGROUND

Most readily available consumer image displaying devices have a limited viewing angle. For instance, a standard consumer projector may have a viewing angle of 90 degrees. In such a case, a video image displayed utilizing such a standard consumer projector has a limited view display. That is, the video image might be projected onto a single wall of a room, or a portion thereof.

Image display systems exist for providing wider view displays, such as an image projected onto multiple walls of a room, than readily available consumer image display devices. However, such devices are typically more costly and more complex than the average consumer desires.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to projecting an image in multiple directions to provide an immersive display. The immersive display can provide imagery that surrounds a viewer. A multi-directional image displaying device can provide an expansive viewing angle from a single compact device that can be placed, for example, in the center of a room. An image projector projects an image towards a distribution object, such as a curved mirror, that can effectively reposition light rays in multiple directions. A wide view display results that expands at least the width of a user's field of view and, thereby, creates a user experience that is more immersive than an image projected by a standard projector. The multi-directional image displaying device is, by design, compact and easily configurable, enabling the insertion of varying image projectors, mirrors, and image capturing devices.

BRIEF DESCRIPTION OF THE DRAWINGS

The present invention is described in detail below with reference to the attached drawing figures, wherein.

DETAILED DESCRIPTION

Figure 1:
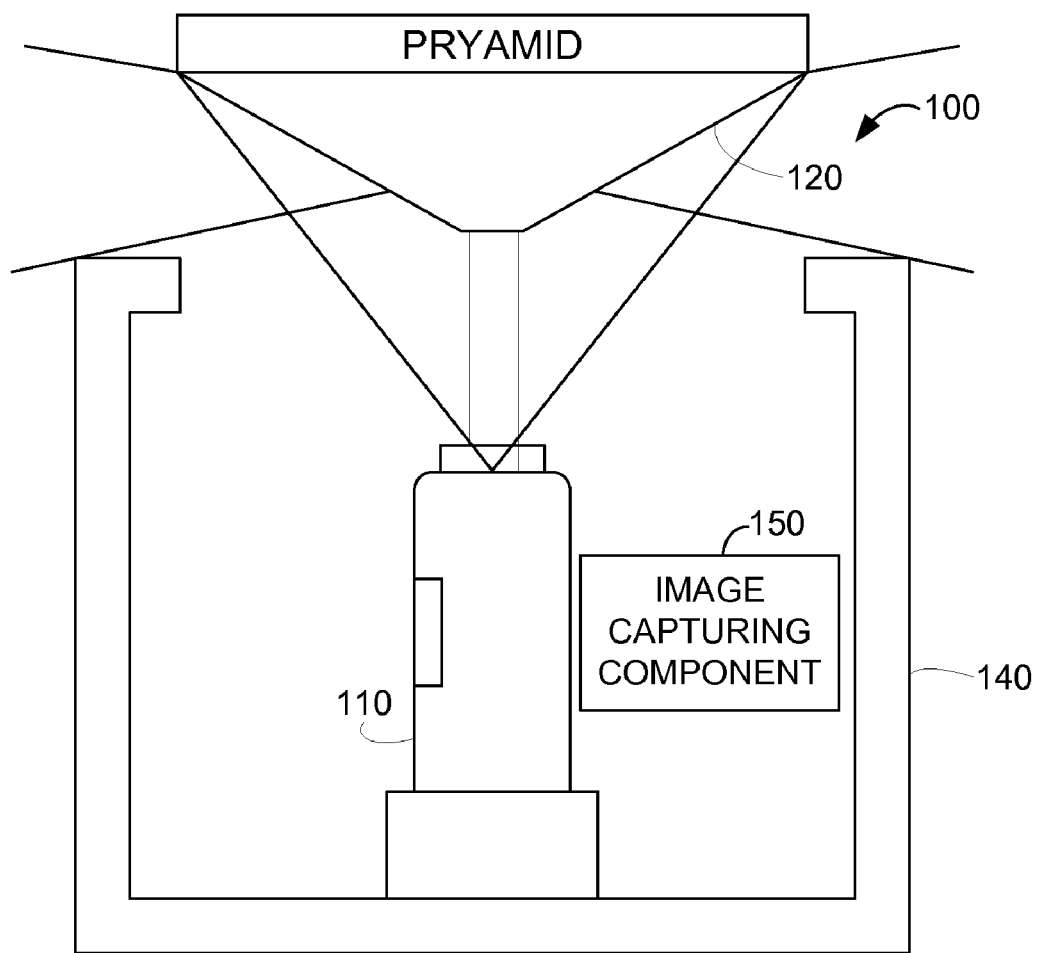
FIG. 1 is a block diagram of an exemplary multi-directional image displaying device, according to an embodiment of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide devices, methods, and systems for projecting an image in multiple directions to provide an immersive display. A multi-directional image displaying device includes a projector that projects images towards a distribution object, such as a curved or multi-planar mirror. The distribution object redirects image pixels in a plurality of directions such that a wide view display results. As such, a multi-directional image displaying device can provide an expansive viewing angle from a single compact device that can be placed, for example, in the center of a room.

Accordingly, in one aspect, the present invention provides a multi-directional image displaying device having a viewing angle that extends at least one hundred eighty degrees around the multi-directional image displaying device to provide a wide view display of an image. The multi-directional image displaying device includes a first image projector for projecting a first image having a plurality of image pixels. A distribution object is aligned with the first image projector for spreading the image pixels projected by the first image projector onto one or more display surfaces. The wide view display of the first image expands at least the width of a user peripheral vision and results from the spreading of the image pixels. A compact housing unit supports the first image projector and the distribution object.

In another aspect, the present invention provides a method for causing images to display in multiple directions extending from a multi-directional image displaying device. The method includes projecting an image from image projectors via light rays corresponding with the image extending from the image projectors. The image projectors are disposed within a housing of the multi-directional image displaying device. A distribution object is utilized to reflect the light rays corresponding with the image in a plurality of directions in accordance with the shape of the distribution object, thereby expanding the viewing angle of the image projectors. The image is displayed on one or more display surfaces, wherein the width of the image extends in multiple directions around the multi-directional image displaying device.

In a further aspect, the present invention provides a multi-directional image displaying system for causing images to display in multiple directions extending from a multi-directional image displaying device. The system includes a housing having a top surface and a bottom surface, wherein the housing is compact. A first image projector projects a video image, the first projector is enclosed within the housing. A distribution object comprising a curved or multi-planar shaped mirror distributes the video image in multiple directions around the housing. The distribution object extends from a top surface or a bottom surface of the housing. The distribution object causes the video image to be displayed on multiple walls within a room. An image source provides the video image to the first projector.

Referring to the drawings in general, and initially to FIG. 1 in particular, a block diagram is illustrated that shows an exemplary multi-directional image displaying device 100. Multi-directional image displaying device 100 is configured to disperse an image in multiple directions such that a wide view display results. That is, multi-directional image displaying device 100 includes a more expansive viewing angle to project a wide view display. A viewing angle refers to the angular extent of an image that is projected by a multi-directional image displaying device. By way of example only, and not limitation, such an expanded viewing angle of a multi-directional image displaying device might range anywhere from about 150 degrees to more than 250 degrees (e.g., 360 degrees) around the multi-directional image displaying device.

A wide view display, as used herein, refers to a display of an image on one or more display surfaces (e.g., walls, ceiling, floor, screens, or the like) with an expanded image size or image dimensions. In particular, an image can be spread out throughout a room to illuminate the entire room (e.g., 360 degrees), or a portion thereof (e.g., two or three walls of the room). In embodiments, a wide view display refers to a display of an image that fills at least the width of a viewer's field of view or peripheral vision. Generally, though not by way of limitation, a viewer's field of view of peripheral vision extends anywhere from about 150 degrees to 180 degrees. As such, a wide view display results in imagery that appears to surround the user. One skilled in the art will appreciate that an image can be displayed on other areas in addition to or alternative to side walls. For example, an image can be projected onto a ceiling, floor, cubical walls, desk areas, or the like.

Figure 2:
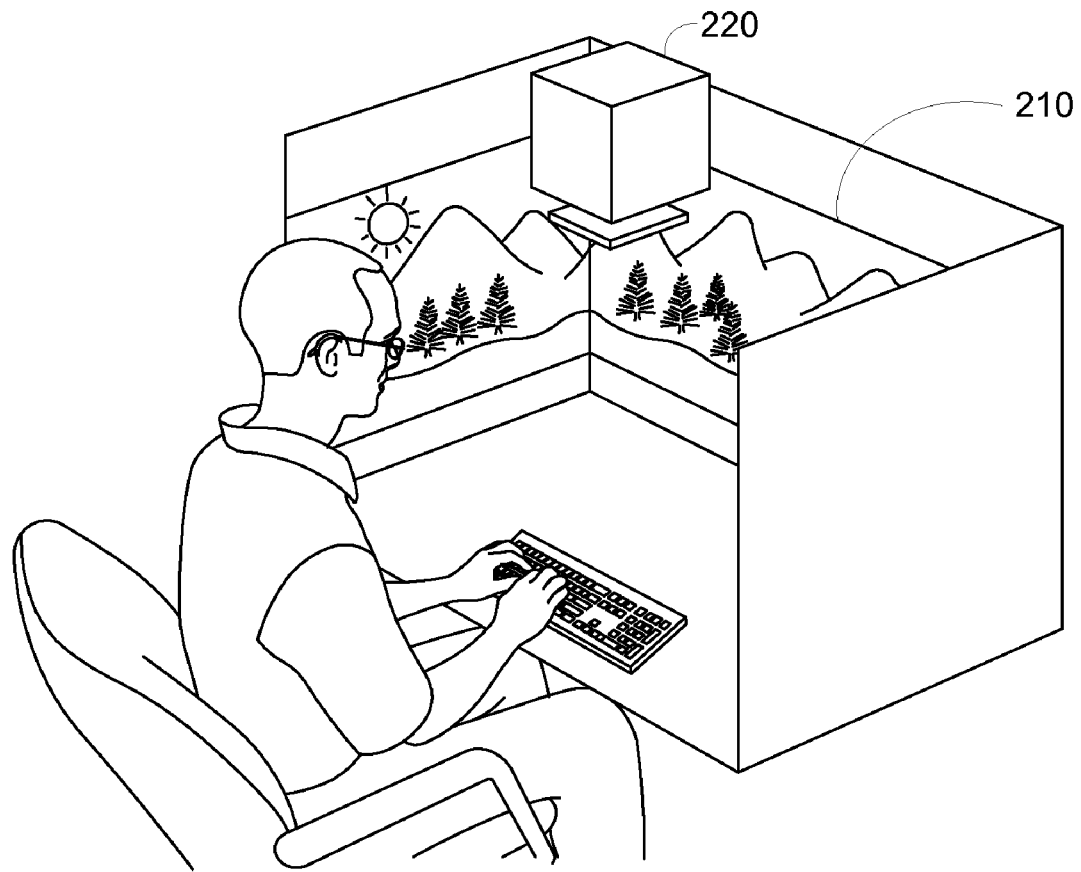
FIG. 2 illustrates a wide view display, according to an embodiment of the present invention.

Providing a wide view display might provide a more immersive user experience than a limited view display could provide. For example, within a home, a multi-directional image displaying device can serve as an immersive display for movies, video games, television, still images, and the like. In a research environment, the multi-directional image displaying device can be used to visualize data, such as high-resolution aerial photographs. In the office, presentations can be displayed 360 degrees around a multi-directional image displaying device, or a wide view display can be generated around the user's desk, office, or cubicle. By way of example only, FIG. 2 illustrates a wide view display 210 that expands approximately 180 degrees around a multi-directional image displaying device 220.

Returning to FIG. 1, multi-directional image displaying device 100 includes an image projector 110, a distribution object 120, a power source 130, a housing 140, and an image capturing component 150. In embodiments, the image projector 110, the distribution object 120, and the power source 130 are disposed or enclosed within the housing 140, or coupled therewith. Any and all such variations, and any combination thereof, are contemplated to be within the scope of embodiments of the present invention.

The image projector 110 refers to a component capable of projecting one or more images onto one or more display surfaces. In embodiments, image projector 110 projects images onto one or more display surfaces via a distribution object, such as distribution object 120. For example, an image projector can project image pixels or rays of light associated with an image onto a distribution object that redirects the image pixels or light rays based on the shape of the distribution object.

An image, as used herein, can include a still image (e.g., a photograph image, a slide show image, a document image, or the like) and/or a video image (e.g., a movie image, a video game image, a television image, or the like). In one embodiment, images projected onto one or more display surfaces might comprise digital images, analog images, or combinations thereof.

One skilled in the art will appreciate that any projector that is capable of projecting images can be used in a multi-directional image displaying device. An image projector might be, for example, a CRT (Cathode Ray Tube) projector, a LCD (Liquid Crystal Display) projector, a DLP™ (Digital Light Projector) projector, a LCOS (Liquid Crystal on Silicon) projector, a D-ILA (Direct-drive Image Light Amplifier) projector, a LED (Light-Emitting Diode) projector, or the like. In embodiments, an image projector can provide a variable spectrum of visible light that is displayed at a particular point (e.g., location, pixel) over time. That is, an image projector can present images that change over time. For example, assume that a first image is initially displayed via an image projector. Further assume that at a later time, a second image is displayed via the image projector. In such a case, the color of light at a particular point in space might vary from the initially displayed image (e.g., red) to the second displayed image presented at a later time (e.g., blue).

The image projector 110, or an image obtaining component associated therewith, might be configured to obtain (e.g., receive or retrieve) images and/or image data from an image source. An image obtaining component refers to any component associated with an image projector that is capable of obtaining (e.g., receiving or retrieving) images and/or image data. Such an image obtaining component can communicate obtained images and/or image data to an image projector such that the image can be displayed. In one embodiment, an image obtaining component is disposed within the housing 140, or coupled therewith.

An image source, as used herein, refers to any component known to those of ordinary skilled in the art that can communicate with an image projector or an image obtaining component such that the image projector or image obtaining component obtains images and/or image data. An image source might comprise, for example, a storage device, a DVD (Digital Versatile Disc) player, a television, a server (e.g., cable service provider server), an image capturing device, a digital camera, a video camera, a gaming console, a computing device (e.g., laptop, desktop, or mobile device), a processing unit, or the like. In embodiments, an image source might be remote from the multi-directional image display device or disposed within the housing of the multi-directional image displaying device, or coupled therewith. In embodiments, an image source can provide images and/or image data automatically or in response to a request from a user or a multi-directional image displaying device.

The image projector 110, or image obtaining component associated therewith, might communicate with an image source via a wired image connector and/or a wireless image connector. A wired image connector may include any wired technology or network used for communication, such as, for example, electrical wires, optical fibers, cable, or the like. A wireless image connector may include any wireless technology or network utilized for communication. Such wired image connectors or wireless image connectors can include components coupled with a multi-directional image display device.

By way of example only, images and/or image data may be downloaded (e.g., from an image capturing device or server) to a computing device (e.g., a user device) and transmitted to the projector via a network. In another embodiment, the images and/or image data may be received directly from an image capturing device. One skilled in the art will appreciate that a multi-directional image displaying device can be configured to communicate with multiple image sources, either alternatively or simultaneously.

Figure 3:
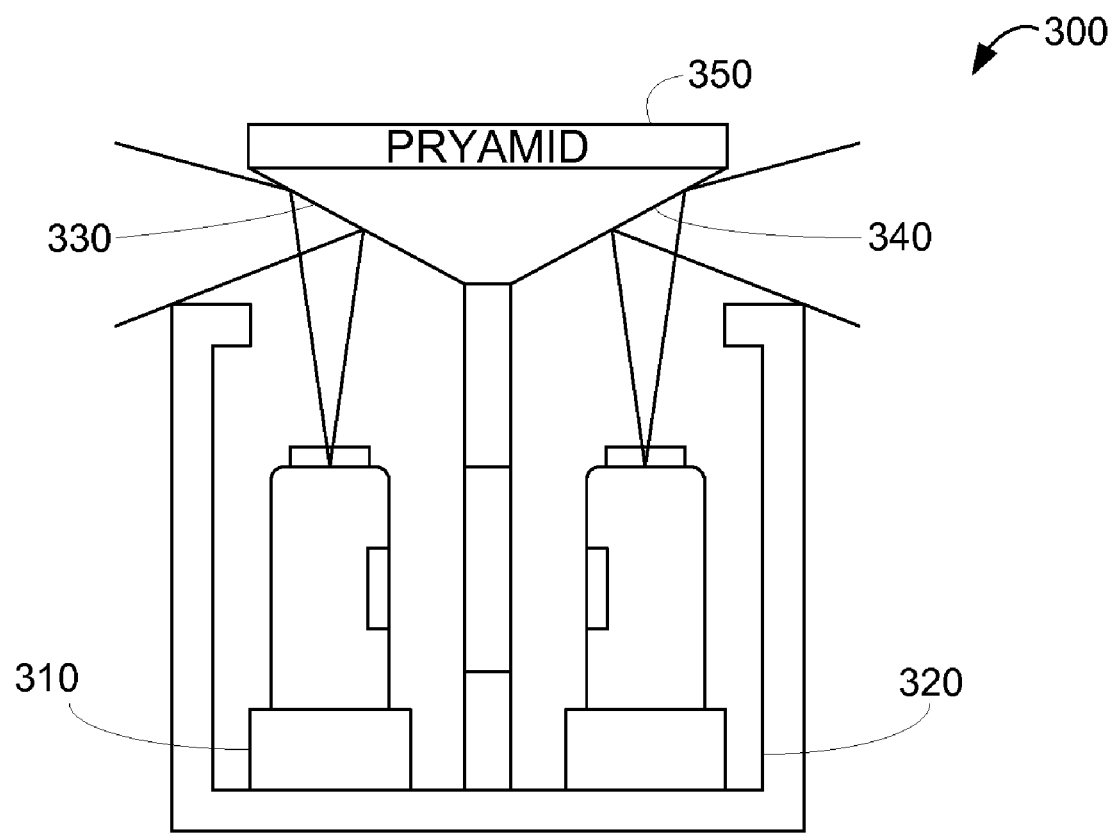
FIG. 3 is a block diagram of a multi-directional image displaying device having a first image projector and a second image projector, in accordance with an embodiment of the present invention.

Although multi-directional image displaying device 100 is shown as having a single image projector 110, a multi-directional image displaying device can include any number of projectors. In one embodiment where multiple projectors are utilized, each projector projects light rays onto a portion of one or more distribution objects. By way of example only, FIG. 3 illustrates a multi-directional image displaying device 300 having a first projector 310 and a second projector 320. The first projector 310 projects light rays onto a first portion 330 of a distribution object 350, and the second projector 320 projects light rays onto a second portion 340 of a distribution object 350.

Additional projectors might be utilized, for example, to obtain a higher resolution of displayed images. By way of example only, assume a first projector projects a particular amount of pixels onto a first portion (e.g., left side) of a distribution object, and a second projector projects the same amount of pixels onto a second portion (e.g., right side) of the distribution object. In such a case, the multi-directional image displaying device can produce a wide view display having two times the amount of display resolution as a multi-directional image displaying device having a single projector.

Referring back to FIG. 1, a distribution object 120 refers to any object that spreads out light rays projected from one or more projectors such that a wide view display results. Such a distribution object enables a more expansive viewing angle of an image displaying device. An image displaying device having a more expansive viewing angle can provide a user experience that is more immersive than a limited viewing angle could provide. A distribution object might be, for example, a mirror, a lens, or any other optics component that is capable of spreading out or redirecting light rays or image pixels to enable a more expansive viewing angle and, thereby, provides a wide view display. A distribution object generates virtual projector positions. That is, a distribution object provides an image as if one or more projectors are located at particular positions around a room.

A distribution object spreads pixels projected from an image projector onto one or more surfaces. Accordingly, distribution objects enable the illumination of images around a room, or a portion thereof (e.g., 2 walls of the room, 3 walls of the room, 4 walls of the room, a particular number of degrees). Distribution objects can comprise any shape or size that enables a wide view display. Distribution object shapes can include a multi-planar surface, a curved surface, or a combination thereof. A multi-planar surface, as used herein, refers to a plurality of planar surfaces (e.g., pyramidal, octagonal, or the like) combined such that image pixels or light rays can be redirected in various directions. Without limitation, a distribution object might have a parabolic shape, a conical shape, a spherical shape, a pyramidal shape, or the like. In some cases, the overhead surface and/or bottom surface of a room can be illuminated in addition to the side walls of the room. For example, a projection of rays onto a spherically-shaped distribution object results in illumination of an image on a ceiling and/or a floor. Alternatively or in addition to, a hole can be generated in the center portion of a distribution object such that the overhead or bottom surface of a room is illuminated.

Figure 4:
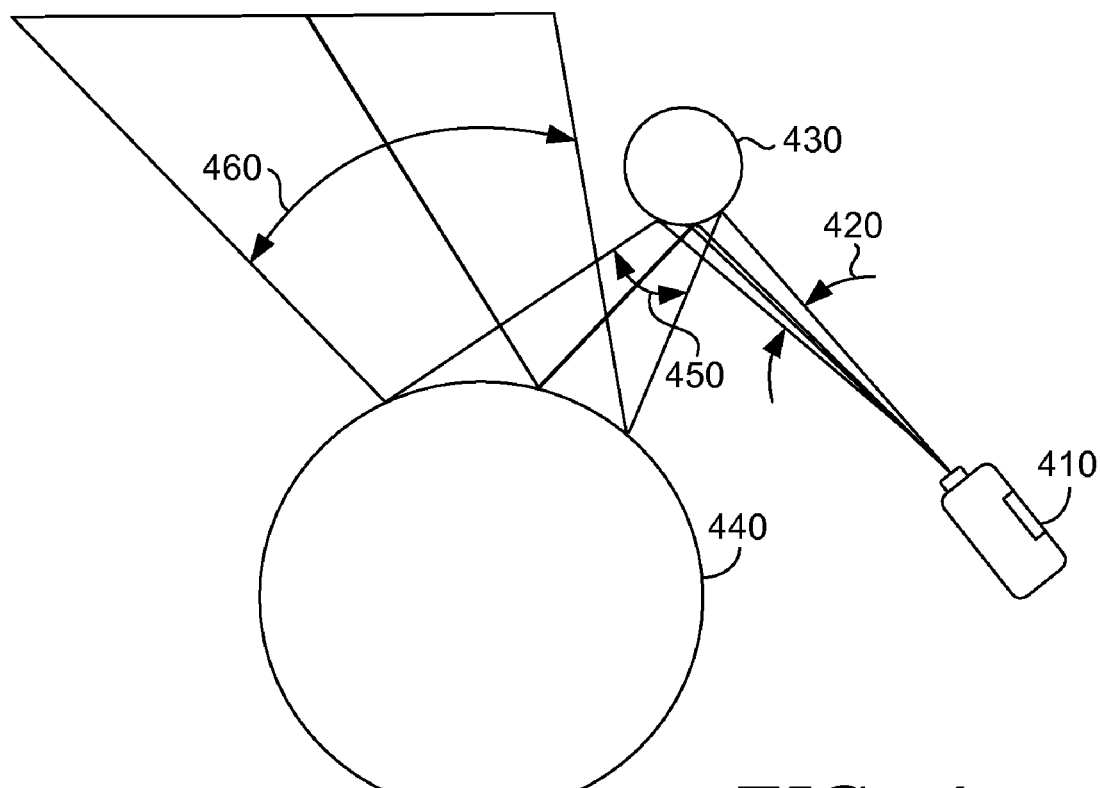
FIG. 4 illustrates a combination of distribution objects used to provide a magnifying effect, in accordance with an embodiment of the present invention.

Although multi-directional image displaying device 100 is shown as having a single distribution object, a multi-directional image displaying device can include any number of distribution objects. For example, a smaller distribution object and a larger distribution object can be used in tandem to provide a magnifying effect. With reference to FIG. 4, a smaller distribution object 430 and a larger distribution object 440 are used in tandem to provide a magnifying effect. Assume that light is emitted from an image projector 410 having a first angle 420 and is directed towards the smaller distribution object 430. The light reflects off of smaller distribution object 430 towards the larger distribution object 440. The smaller distribution object 430 effectively becomes a light projector, wherein each pixel of the projector now subtends a larger second angle 450 (e.g., solid angle). The light further reflects off of larger distribution object 440 thereby spreading further the angle of the pixels such that a larger third angle 460 results. The pixels originally emitted from the image projector 410 subtended a small angle and, after a double reflection, the same pixels subtend a larger angle. As such, the visual effect is a zooming or magnifying of the pixels. By way of further example, a multi-directional image displaying device might include a plurality of distribution objects that together disperse an image in multiple directions.

A power source 130 refers to any component utilized to supply electrical or another type of energy to the multi-directional image displaying device 100. In embodiments, the power source 130 can be a power cord, a battery, or the like.

The housing 140 refers to any component that at least partially supports, encases, or surrounds the image projector 110 and/or the distribution object 120. In one embodiment, the housing 140 supports both the image projector 110 and/or the distribution object 120. In such an embodiment, the distribution object 120 might extend from a main portion of the housing 140 such that light rays can reflect from the distribution object and provide a wide view display on one or more surfaces. In such a case, the distribution object 120 might extend below a top surface or a bottom surface of the housing 140. The housing 140 can have any shape, such as, for example, a rectangle, a cube, a pyramid, a sphere, an oval, or the like. One skilled in the art will appreciate that, in one embodiment, a housing unit is not utilized.

The housing 140 provides a compact device that does not require an extensive set up. Accordingly, multiple projectors do not need to be independently placed throughout a room, aligned, calibrated, and/or wired to generate a wide view display. Rather, a single device can be used to illuminate a wide view display from one location. Such a multi-directional image displaying device can be attached to a ceiling for a multi-directional projection or placed on an object (e.g., table or other furniture piece) for multi-directional projection. A compact housing can refer to a housing that can rest on top of a coffee table, desk, or the like.

Figure 5:
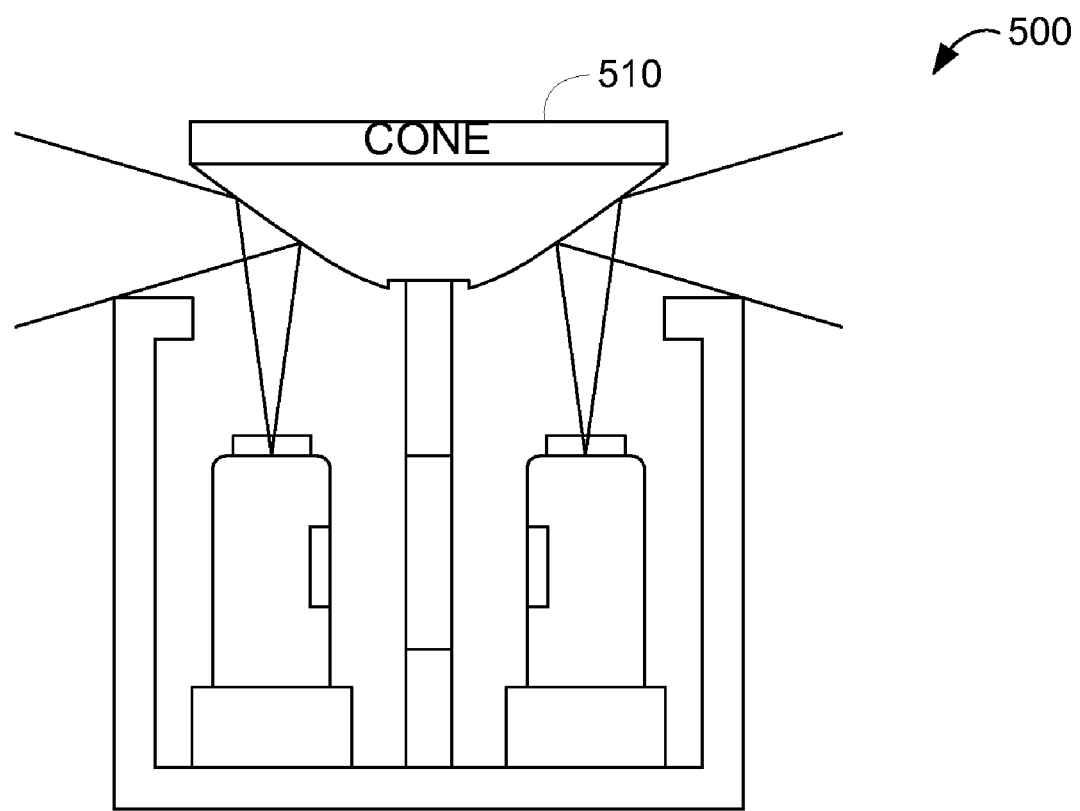
FIG. 5 illustrates a multi-directional image displaying device having a cone shaped distribution object, according to an embodiment of the present invention.

A user can, in some cases, adjust components of a multi-directional image displaying device to modify a wide view display. In one embodiment, a distribution object is capable of being exchanged with another distribution object. By way of example only and with reference to FIGS. 3 and 5, assume that a multi-directional image displaying device 300 initially includes a pyramid-shaped distribution object 350. To alter the display of the image, the pyramid-shaped distribution object 350 could be exchanged for a distribution object of a different size and/or shape, such as a cone-shaped distribution object 510 as illustrated in FIG. 5. In some cases, a distribution object can be exchanged without necessitating a user to perform any further manual set up actions, such as alignment, calibration, and/or wiring.

In another embodiment, placement of one or more image projectors relative to one or more distribution objects can be adjusted to modify a wide view display. For example, the distribution object could be positioned closer to or further from one or more image projectors. Positioning a distribution object closer to or further from an image projector can modify the distance between image pixels (e.g., spread out or condense the pixels). Alternatively or in addition to, an orientation of the distribution object and/or an image projector could be adjusted. For example, because the image projectors reposition light rays projected from an image projector, moving virtual positions can be performed by adjusting the orientation of the distribution object relative to the image projector. Further, one or more image projectors could be turned on or off. As such, reconfiguration of a wide view display can be quickly and easily modified.

The multi-directional image displaying device 100 might also include an image capturing components 150. In embodiments, one or more image capturing components are disposed within the housing. An image capturing component may be any device known to those of ordinary skill in the art that is configured for capturing images. By way of example only, image capturing component may be a digital camera configured for capturing still image data, a camera configured for capturing video image data, and any combination thereof. In an embodiment where an image capturing component is disposed within a housing and is aimed at a distribution object, the image capturing component can be used to capture panoramas including 360 degree panoramas. For example, assume a multi-directional image displaying device is placed in a center of a room. Further assume that an image is projected such that a wide display view results. An image capturing device can take an image of the distribution object, such as a curved mirror, and capture the reflection of the image displayed on the walls. In an alternative embodiment, an image capturing component might be external to the multi-directional image display device.

Images captured from the imaging capturing component and/or image data (i.e., data associated with an image) can be utilized to modify images to be projected such that the image displayed on one or more surfaces is uniform and/or undistorted. For example, most rooms are rectangular and oftentimes have furniture positioned in the room. In addition, different lighting can exist throughout the room. In such a case, an image projected over an item in the room (e.g., corner, furniture, or the like) or in varied lighting can appear to a viewer as distorted and not uniform. As such, it is desirable to correct images to be displayed to account for distortions caused by projecting onto non-planar surfaces and/or non-uniform albedo.

In embodiments where captured images and/or image data are utilized to modify images to be projected, the image capturing component can communicate with a processing unit, such as an optical processing unit, that can modify images to be projected. An optical processing unit, as used herein, is configured to utilize images captured by an image capturing component and/or image data to modify images that are to be projected such that the projected images are uniform and undistorted (i.e., modify an image or projection thereof to coordinate with the geometrical shape and lighting of the room). Such an optical processing unit might be configured to communicate with one or more image capturing components, one or more projectors, one or more image sources, one or more multi-directional image displaying devices, combinations thereof, or the like. By way of example only, an optical processing unit might obtain (e.g., receive or retrieve) images captured from an image capturing component and images for display from an image source. Based on the images captured from the image capturing component, and image data associated therewith, the optical processing unit can modify the images obtained from the image source that are to be displayed. Such modified images can be communicated to a projector, or a receiving component, associated with a multi-directional image displaying device.

Figure 6:
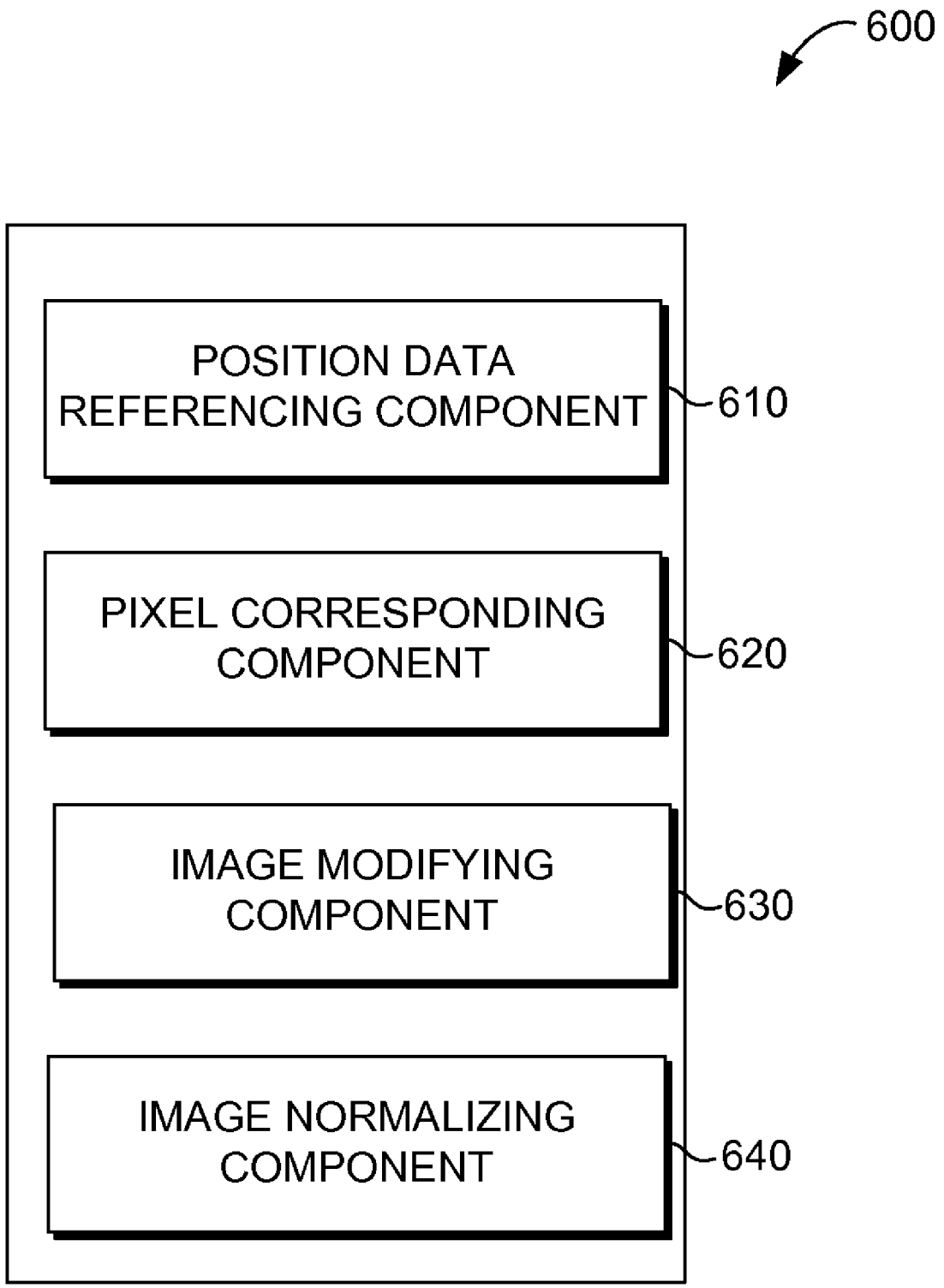
FIG. 6 is a block diagram of an exemplary optical processing unit, in accordance with an embodiment of the present invention.

With reference to FIG. 6, an exemplary optical processing unit 600 might include a position data referencing component 610, a pixel corresponding component 620, an image modifying component 630, and an image normalizing component 640. In embodiments, optical processing unit 600, or portions thereof, might be disposed within a multi-directional image displaying device or be remote from such a displaying device. The position data referencing component 610 is configured to reference position data of an image projector relative to an image capturing component. That is, the position data referencing component 610 references the relative position between a projector and an image capturing component. Such a relative position can be provided by a user or manufacturer. Alternatively, such a relative position may be determined or identified via the position data referencing component 610 or another component, application, or computing device. Any standard calibration technique can be utilized to identify such a relative position between a projector and an image capturing component. One skilled in the art will appreciate that a relative position can be indicated utilizing any measurement unit and/or direction indicator. In embodiments, such a position data referencing component 610 can reference position data pertaining to the position of an image capturing component, a position of an image projector, or any other components of a multi-directional image displaying system.

The pixel corresponding component 620 is configured to determine information regarding the correspondence between one or more pixels projected from an image projector and one or more pixels captured by an image capturing component. That is, for each of one or more pixels projected, the pixel corresponding component 620 identifies a corresponding pixel of the captured image. Information regarding the correspondence may include, by way of example and not limitation, a matching or mapping of pixels, a distance between corresponding pixels, identification of corresponding pixels, or the like. Such corresponding pixels can be identified utilizing a projected image or pattern, a corresponding captured image, and a relative position between a projector and a camera, such as a relative position referenced by position data referencing component 610. In embodiments, pixel corresponding component 620 is configured to reference one or more projected images or patterns, one or more corresponding captured images, image data associated with projected images or captured images, relative position data, combinations thereof, or the like. The pixel corresponding component 620 might, in some instances, be configured to initiate the projection of a pattern or an image and/or the capturing of the projected pattern or the projected image.

Upon determining information regarding the correspondence between pixels projected from an image projector and pixels captured by an image capturing component, in one embodiment, the pixel corresponding component 620, or another component, reconstructs a three-dimensional model of the room utilizing triangulation. Such triangulation can be performed, for example, using the position data referenced by position data referencing component 610 and the correspondence between one or more pixels projected from a projector and one or more pixels captured by an image capturing component as determined by the pixel corresponding component 620.

Figure 7:
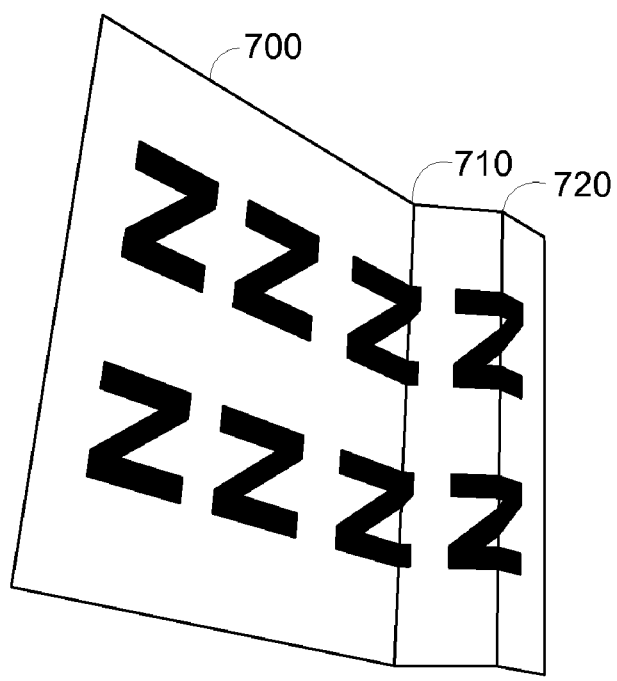
FIG. 7 illustrates a display of a distorted image.
Figure 8:
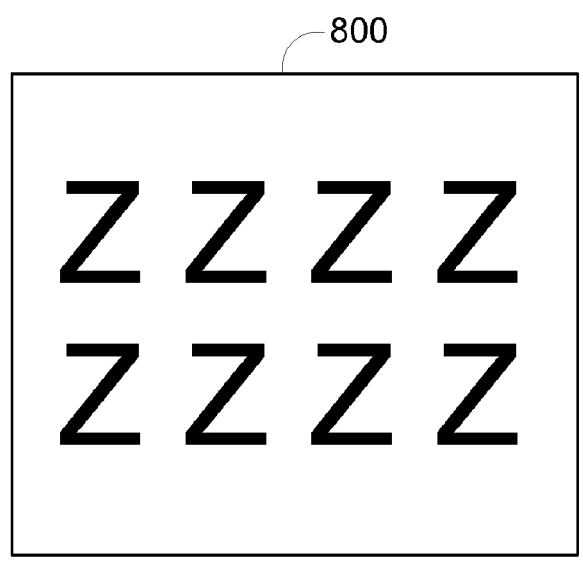
FIG. 8 illustrates a display of an image modified to correct geometrical distortions.

The image modifying component 630 is configured to modify one or more images to be projected so that the images appear geometrically correct to a viewer. In embodiments, image modifying component 630 utilizes a three-dimensional model of the room, such as a model reconstructed by pixel corresponding component 620, to modify one or more images to be projected so that the images appear correctly to a viewer. Such an image modifying component 630 corrects geometrical distortion caused by items (e.g., corners, furniture, or the like) within the room. By way of example, and with reference to FIGS. 7 and 8, FIG. 7 illustrates an image 700 displayed in the corner of the room. Displaying the image 700 over corner 710 and corner 720 results in a distorted view of image 700. FIG. 8 illustrates a modified image 800 after removing the geometrical distortion.

Images to be projected can be modified in accordance with a particular viewpoint. A viewpoint refers to a location at which a viewer views an image displayed on one or more surfaces. As such, an optical processing unit can modify images to be projected for a particular viewpoint in a room, such as the center of the room or a position of a viewer's chair. Such a viewpoint can be identified utilizing, for example, an image capturing component, user input indicating a preferred viewpoint, predetermined information, or the like.

Figure 9:
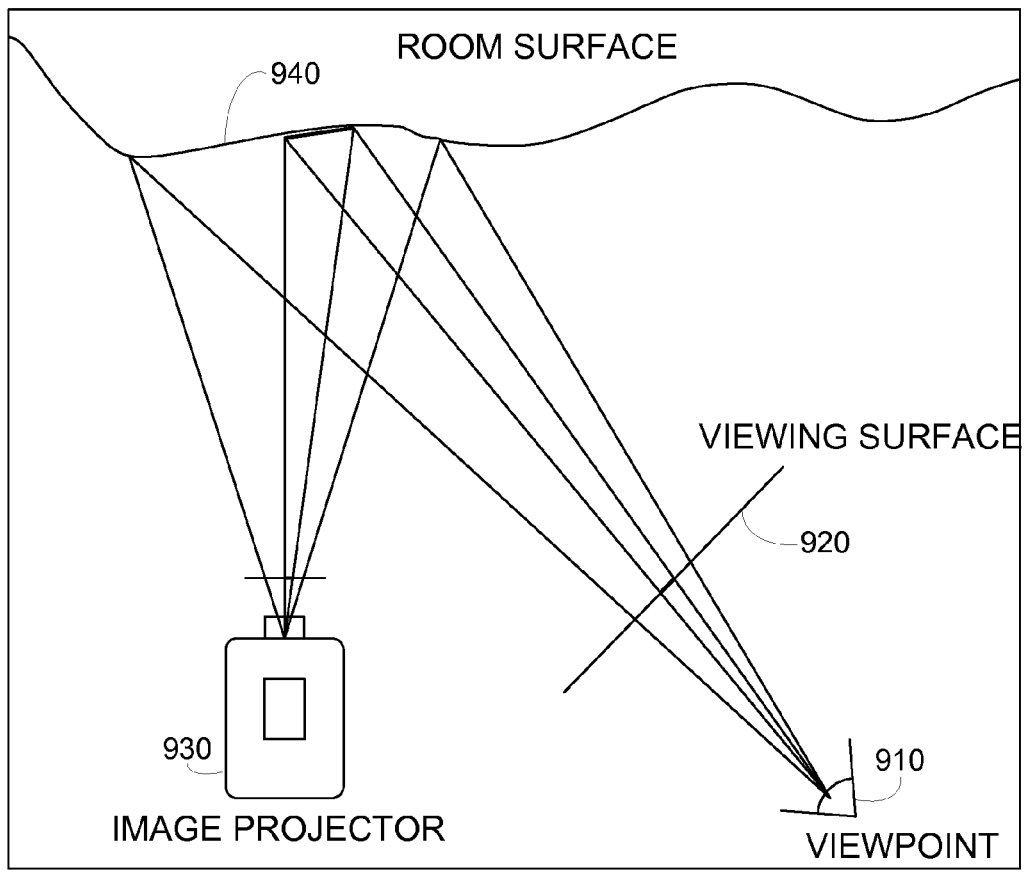
FIG. 9 illustrates a modification of an image to appear aligned at a viewpoint, according to an embodiment of the present invention.

By way of example only and with reference to FIG. 9, assume it is established that a consumer is positioned at viewpoint 910. Further assume that a viewing surface 920 is identified. A viewing surface refers to a virtual surface on which images will appear to be projected. An image is projected from image projector 930 onto a room surface 940 and redirected onto viewing surface 920. The image modifying component 630 of FIG. 6 can modify the original projector image such that it will appear undistorted when viewed on the viewing surface 920 of FIG. 9. Such an image modification can be accomplished by ray tracing or texture mapping techniques.

In some embodiments, images can be dynamically modified in accordance with a viewpoint. For example, assume a viewer is located at a first position and a projected image is modified to correct distortion in accordance with the first viewpoint. Now assume that the viewer moves across the room to a second position (e.g., during a movie or at the beginning of a second movie). In such a case, if the presented images remain modified in accordance with the first viewpoint, the displayed images may appear distorted to the viewer at the second position.

As such, in some embodiments, the optical processing unit, or another component, might track the viewer's position to identify a real-time viewpoint. Such information regarding a viewer position enables a dynamic modification of images so that images appear undistorted despite movement of a viewer. One skilled in the art will appreciate that any technology, such as motion sensors, audio components, image capturing components, and corresponding software, can be utilized to track a viewer's position. For example, a motion tracking software (e.g., head tracking), such as TrackIR™ by NaturalPoint® Inc., can be utilized to track the position of the viewer. Upon determining a position of a viewer, such a position can be used to modify images for display to the viewer.

Referring back to FIG. 6, the image normalizing component 640 is configured to normalize one or more images to be projected to account for non-uniform albedo. For example, assume a portion of an image is to be projected onto a dark window sill in the room, the normalization would brighten that particular portion of the image to make it appear more uniform when viewed by the user. In one embodiment, normalization is accomplished by directly increasing or decreasing the brightness for each pixel of the projector image. The image normalizing component 640, or another component, can be configured to determine the one or more pixels to be adjusted and the extent of the adjustment required to account for non-uniform albedo.

Any and all such variations of an optical processing unit, and any combination thereof, are contemplated to be within the scope of embodiments of the present invention. For example, any number of components can be utilized to perform embodiments of the present invention. Although described as a single optical processing unit, components described herein can reside on any number of processing units, computing devices, or the like. For example, a first portion of the components might reside within a multi-directional image displaying device while a second portion of the components might reside remote from the multi-directional image displaying device (e.g., within an image source, image capturing device, or other computing device external to the multi-directional image displaying device). Further, optical processing unit might only correct one of geometrical distortion or non-uniform albedo.

Alternatively or in addition to utilizing captured images to modify images, captured images can be used for interaction applications. In embodiments where captured images are utilized for interaction applications, the image capturing component can communicate with a processing component, such as an interaction processing unit. An interaction processing unit, as used herein, is configured to utilize images captured by an image capturing component to recognize and apply interactions. Such an interaction processing unit might be configured to communicate with one or more image capturing components, one or more image projectors, one or more image sources, one or more multi-directional image displaying devices, combinations thereof, or the like.

Figure 10:
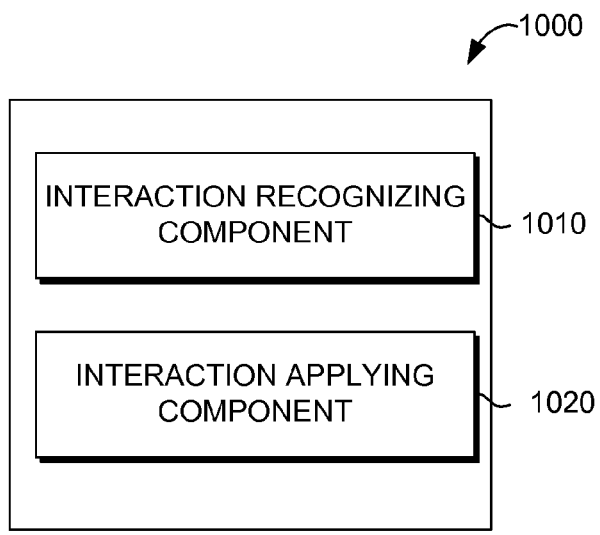
FIG. 10 is a block diagram of an exemplary interaction processing unit, in accordance with an embodiment of the present invention.

With reference to FIG. 10, an exemplary interaction processing unit 1000 might include an interaction recognizing component 1010 and an interaction applying component 1020. Interaction recognizing component 1010 is configured to recognize an image interaction. An image interaction, as used herein, refers to a user's interaction with a displayed image, or the environment associated therewith. The interaction recognizing component 1010 might recognize an image interaction based on the position of an item (e.g., hand, pointer, head, or the like) within a captured image. For example, assume an image captures a user's hand touching a portion of a displayed image or a shadow, or a dot of a laser pointer on the projected image. In such a case, interaction with a displayed image can be identified. In embodiments, interaction recognizing component 1010 is configured to reference images captured by an image capturing device. The captured images are images of images displayed via a multi-directional image displaying device. An interaction may also involve physical items present in a room. For example, pointing or gesturing at the bookshelf may cause the books to be highlighted by illuminating the appropriate pixels in the projector image.

In addition to identifying that an image interaction with a displayed image has occurred, interaction recognizing component 1010 can, in embodiments, recognize the type of image interaction (e.g., touch, motion, selection, other manipulation), the location of the image interaction, or other information pertaining to the interaction (e.g., speed or direction of interaction). For example, interaction recognizing component 1010 might be able to determine the location at which a user contacts a displayed image. By way of another example, interaction recognizing component 1010 might be able to determine a direction and/or speed of a user's motion (e.g., walking, arm movement, or the like). One skilled in the art will appreciate that any type of technology can be used to recognize interaction. In embodiments where multiple interactions can be recognized by interaction recognizing component 1010, a recognized interaction might be associated with a particular action.

The interaction applying component 1020 is configured to apply an image action based on an interaction recognized by the interaction recognizing component 1010. An image action, as used herein, refers to any action that manipulates the wide view display. An image action may include, but is not limited to, projecting another image, modifying the color, size, shape, or other attribute of the image, moving the image, or otherwise manipulating the image. For example, assume the interaction recognition component 1010 recognizes that a user contacts a displayed image at a particular area. Where a contact interaction is regarded as a clicking operation, the interaction applying component 1020 might initiate a display of a different image or another image action. By way of further example, assume the interaction recognizing component 1010 recognizes a motion of a user. In such a case, the interaction applying component 1020 might initiate movement of an image capturing component, an image projector, or the like, in the direction of the user motion.

Any and all such variations of an interaction processing unit, and any combination thereof, are contemplated to be within the scope of embodiments of the present invention. For example, any number of components can be utilized to perform embodiments of the present invention. Although described as a single interaction processing unit, components described herein can reside on any number of processing units, computing devices, or the like. For example, a first portion of the components might reside within a multi-directional image displaying device while a second portion of the components might reside remote from the multi-directional image displaying device (e.g., within an image source, image capturing device, or other computing device external to the multi-directional image displaying device).

Figure 11:
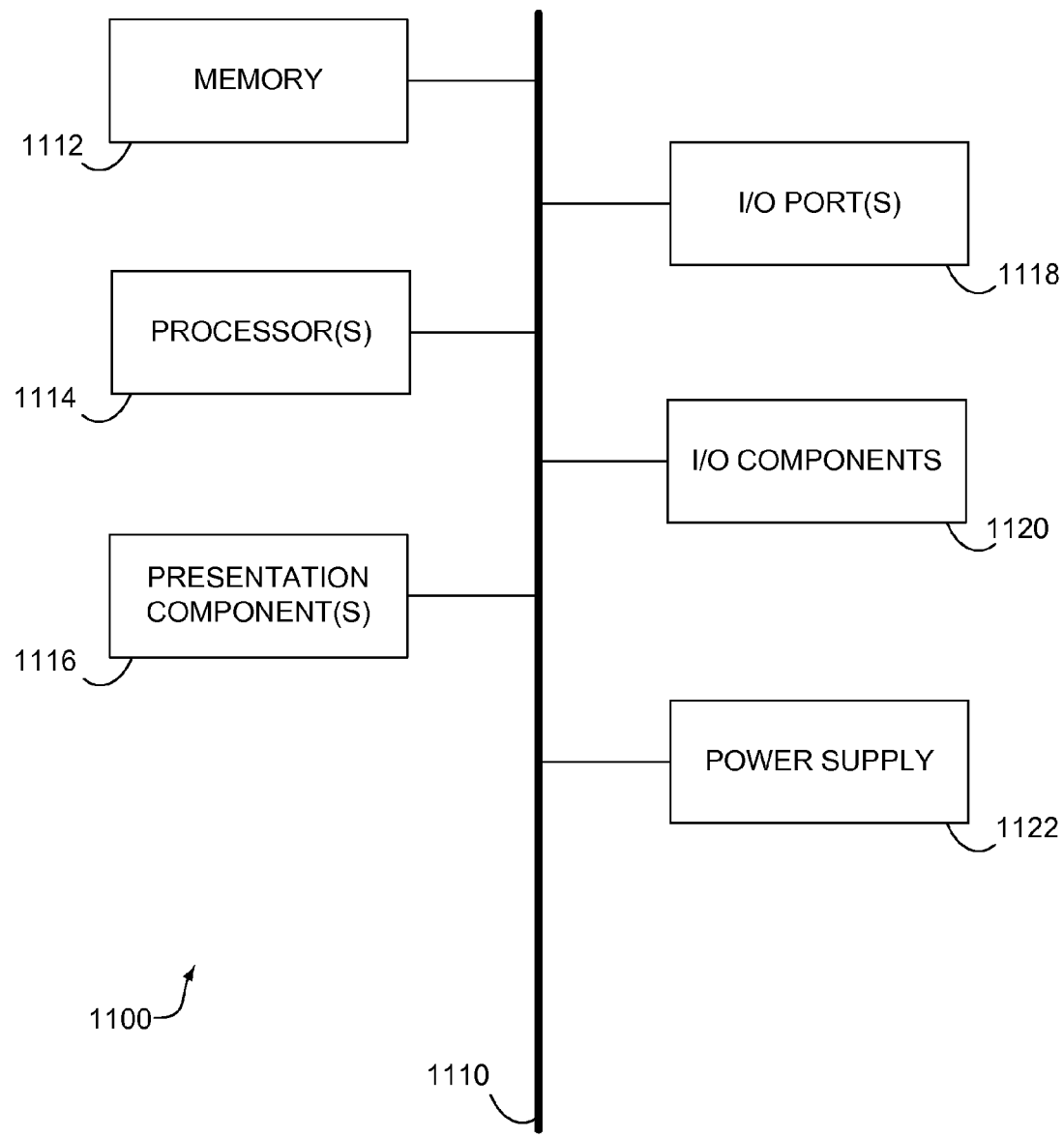
FIG. 11 is a block diagram of an exemplary operating environment for implementing embodiments of the present invention.

Turning to FIG. 11, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing environment 1100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 11, computing device 1100 includes a bus 1110 that directly or indirectly couples the following devices: memory 1112, one or more processors 1114, one or more presentation components 1116, input/output (I/O) ports 1118, I/O components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computer" or "computing device."

Computing device 1100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 1100.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc. I/O ports 1118 allow computing device 1100 to be logically coupled to other devices including I/O components 1120, some of which may be built in. Illustrative components include a microphone, joystick, game pad, satellite dish, scanner, printer, wireless device, network component (e.g., wired or wireless), etc.

Figure 12:
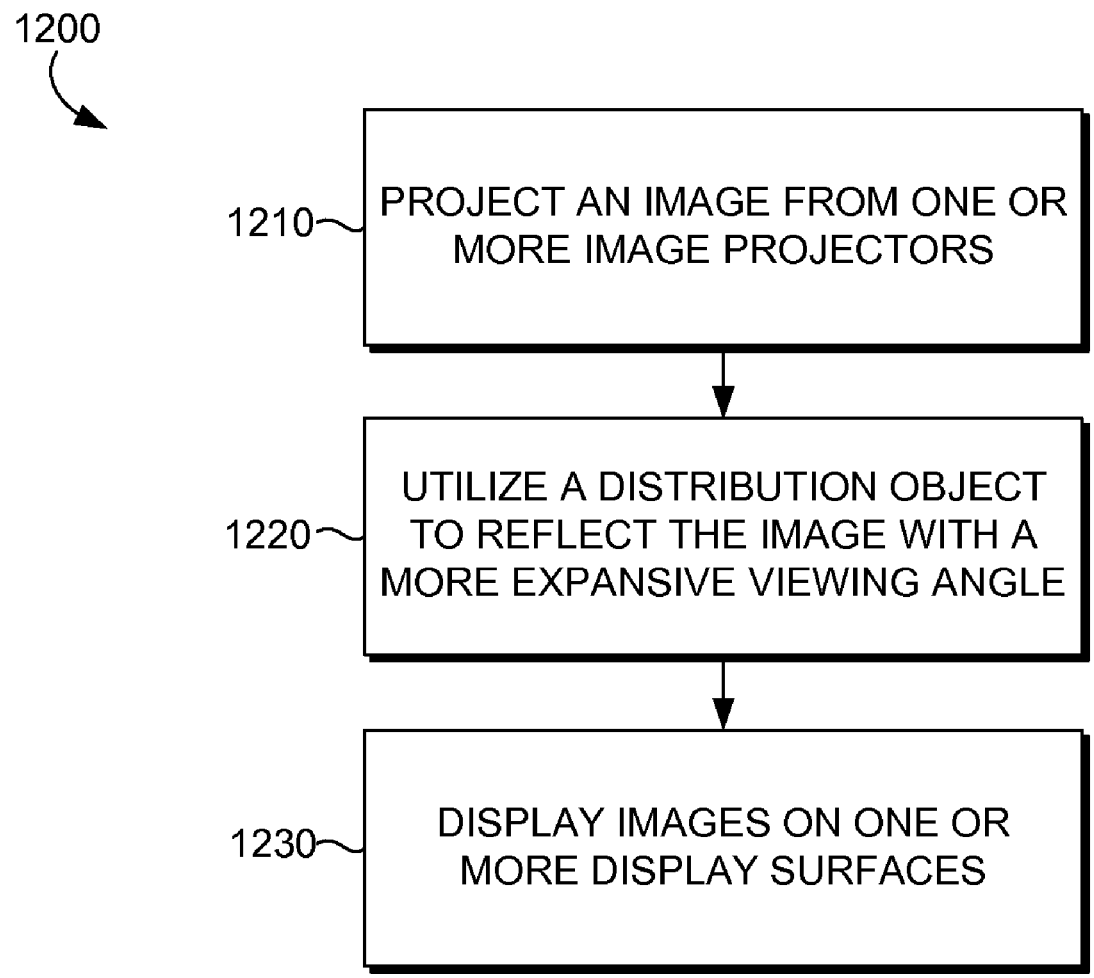
FIG. 12 is a flow diagram illustrating a method for causing images to display in multiple directions, according to an embodiment of the present invention.

Turning now to FIG. 12, a block diagram illustrating a method for causing images to display in multiple directions is shown and designated generally as reference numeral 1200. Initially, as indicated at block 1210, an image is projected from one or more image projectors. In embodiments, the image is projected in the form of light rays or image pixels. The image projected by an image projector can be obtained from any image source. Thereafter, at block 1220, a distribution object is utilized to reflect the image such that the image is projected with a more expansive viewing angle (e.g., at least 180 degrees). As such, the displayed image will appear to surround a viewer. The image is displayed on one or more display surfaces. This is indicated at block 1230. Generally, though not by way of limitation, the width of the image expands the width of a viewer's field of view.

Figure 13:
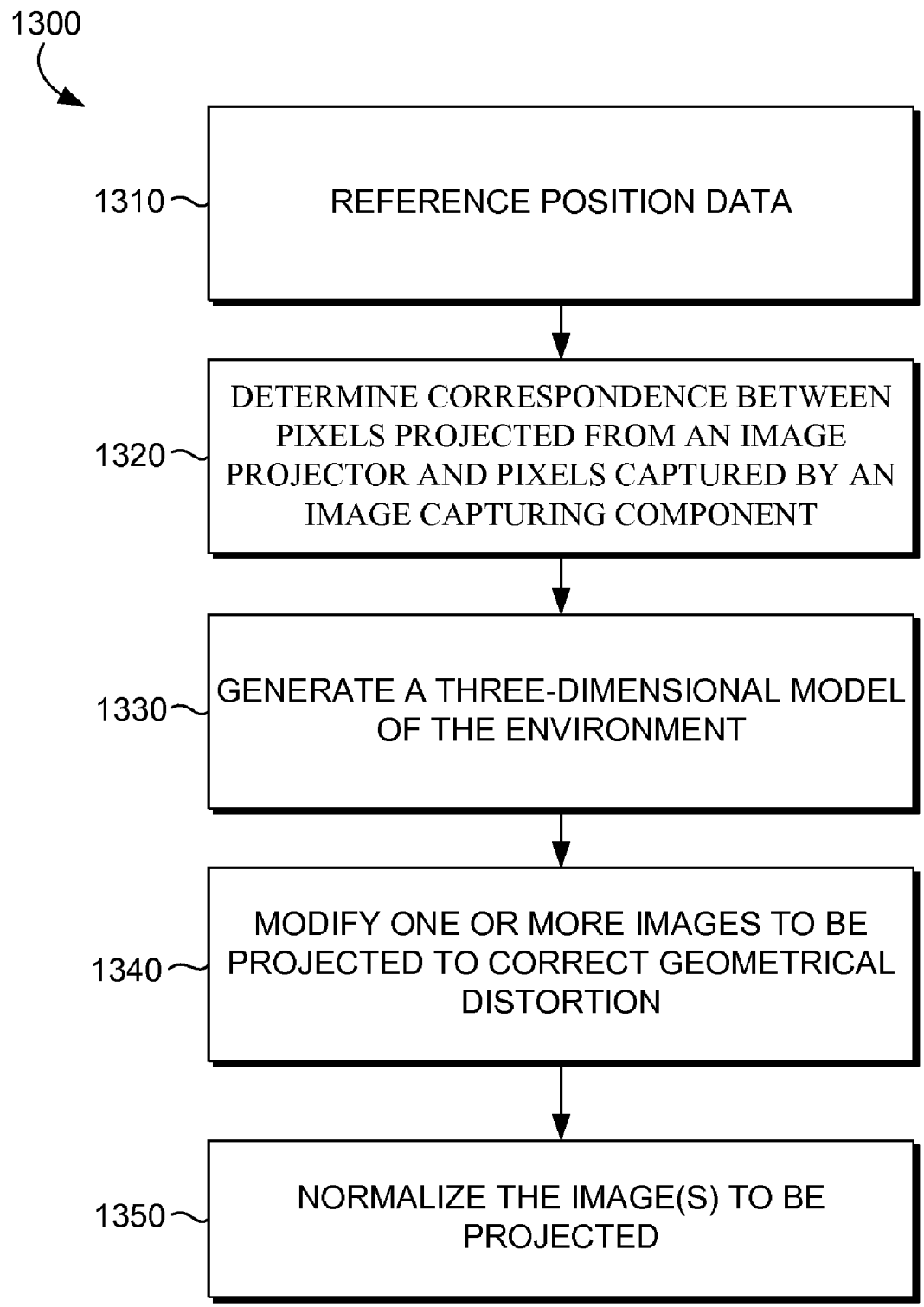
FIG. 13 is a flow diagram, in accordance with an embodiment of the present invention, illustrating a method for modifying images to be projected.

With reference to FIG. 13, a flow diagram is shown illustrating a method 1300 for modifying images to be projected such that the projected images are uniform and undistorted, in accordance with an embodiment hereof. Initially, as indicated at block 1310, position data is referenced. The position data can indicate, for example, the position of an image projector, the position of an image capturing component, a relative position between the image projector and the image capturing component, and the like. At block 1320, information associated with correspondence between one or more pixels projected from an image projector and one or more pixels captured by an image capturing component is determined. Subsequently, utilizing the referenced position data and the correspondence information, a three-dimensional model of the environment surrounding the multi-directional image displaying device can be generated. This is indicated at block 1330. At block 1340, one or more images to be projected are modified to correct geometrical distortion. In embodiments, the three-dimensional model of the environment is utilized to modify the images. The one or more images to be projected are normalized at block 1350 to account for non-uniform albedo.

Figure 14:
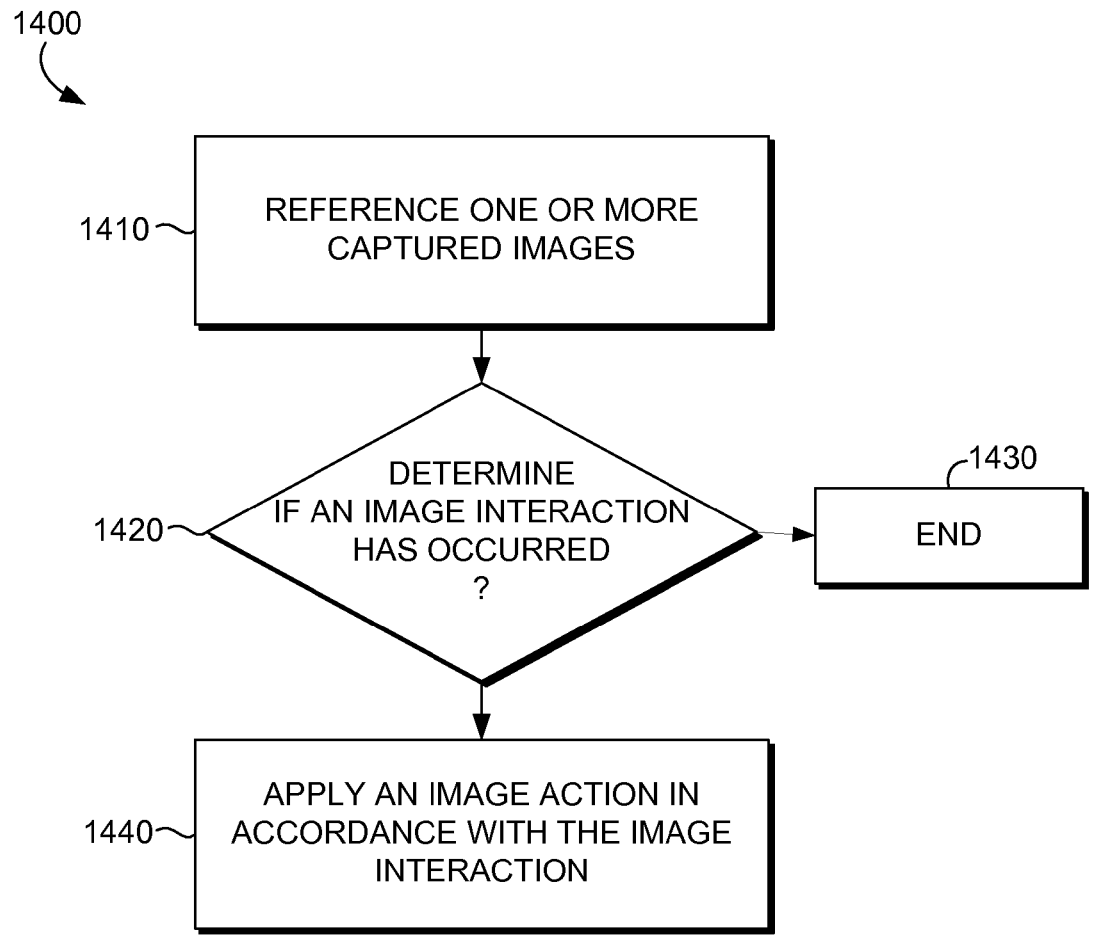
FIG. 14 is a flow diagram illustrating a method for utilizing captured images for interaction applications, according to an embodiment of the present invention.

Turning now to FIG. 14, a flow diagram is shown illustrating a method 1400 for utilizing captured images for interaction applications, in accordance with an embodiment hereof. Initially, as indicated at block 1410, one or more images captured by an image capturing component are referenced. Thereafter, at block 1420, it is determined whether an interaction with a displayed image has occurred. If it is determined that an interaction with a displayed image has not occurred, the method ends at block 1430. If, however, it is determined that an interaction with a displayed image has occurred, at block 1440, an image action is applied in accordance with the image interaction.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A multi-directional image displaying device having a viewing angle that extends at least one hundred eighty degrees around the multi-directional image displaying device to provide a wide view display of an image, the multi-directional image displaying device comprising:
   a first image projector for projecting a first image having a plurality of image pixels;
   a distribution object aligned with the first image projector for spreading the image pixels projected by the first image projector onto one or more display surfaces, wherein a wide view display of the first image that expands at least the width of a user field of view results from the spreading of the image pixels;
   an image capturing component directed towards the distribution object for capturing one or more images of the distribution object that includes the reflection of the image projected onto the one or more display surfaces, wherein the one or more captured images are utilized to modify a second image to be projected from the first image projector; and
   a compact housing unit to support the first image projector and the distribution object.

2. The multi-directional image displaying device of claim 1, wherein the first image comprises a digital image.

3. The multi-directional image displaying device of claim 2, wherein the first image comprises a still image or a video image.

4. The multi-directional image displaying device of claim 1, wherein the distribution object comprises a parabolic shaped mirror, a conical shaped mirror, a spherical shaped mirror, a pyramidal shaped mirror, a piecewise planar mirror, or a general smooth surface.

5. The multi-directional image displaying device of claim 1, wherein each of the one or more display surfaces comprise a wall in a room.

6. The multi-directional image displaying device of claim 1, wherein the second image is modified to account for distortion caused by projecting the second image onto non-planar surfaces.

7. The multi-directional image displaying device of claim 6, wherein the second image is modified utilizing at least one of the one or more captured images and the corresponding projected first image to determine the correspondence between one or more pixels projected from an image projector and one or more pixels captured by an image capturing component.

8. A method for causing images to display in multiple directions extending from a multi-directional image displaying device, the method comprising:
   projecting a first image from one or more image projectors via light rays corresponding with the first image extending from the one or more image projectors, the one or more image projectors disposed within a housing of the multi-directional image displaying device;
   utilizing a distribution object to reflect the light rays corresponding with the first image in a plurality of directions in accordance with the shape of the distribution object, thereby expanding the viewing angle of the one or more projectors;
   displaying the first image on one or more display surfaces, wherein the width of the first image extends in multiple directions around the multi-directional image displaying device;
   capturing a second image of the distribution object that includes the reflection of the first image displayed on the one or more display surfaces; and
   utilizing the first image and the second image to modify a third image to be projected from the one or more image projectors such that the third image is undistorted when projected onto a non-planar surface of the one or more display surfaces.

9. The method of claim 8, wherein the width of the image extends three hundred sixty degrees around the multi-directional image displaying device.

10. The method of claim 8 further comprising utilizing the position data indicating the relative position of the one or more image projectors and an image capturing component to modify the third image to be projected via the one or more image projectors.

11. The method of claim 8 further comprising utilizing the captured image to identify if a user interaction exists, wherein the displayed image is manipulated in accordance with the user interaction if the user interaction exists.

12. The method of claim 8, wherein the distribution object comprises a curved or multi-planar mirror or lens.

13. The method of claim 8, wherein the distribution object can be removed and replaced with another distribution object to control a size, a shape, or a combination thereof of the image displayed.

14. A multi-directional image displaying system for causing images to display in multiple directions extending from a multi-directional image displaying device, the system comprising:
- a housing having a top surface and a bottom surface, wherein the housing is compact;
- a first image projector that projects a video image, the first projector enclosed within the housing;
- a distribution object comprising a curved or multi-planar shaped mirror that distributes the video image in multiple directions around the housing, the distribution object extending from the top surface or the bottom surface of the housing, wherein the distribution object causes the video image to be displayed on multiple walls;
- an image capturing component to capture one or more images, wherein the one or more captured images are utilized to modify at least one image to be projected from the first image projector, the image capturing component disposed within the housing;
- a processor to perform at least one of determining a correspondence between one or more pixels projected from the first image projector and one or more pixels captured by the image capturing component, reconstructing a three-dimensional model of a room, or portion thereof, in which the image is being displayed, modifying the at least one image to be projected from the first image projector to account for geometrical distortion, and normalizing at least one image to be projected from the first image projector to account for non-uniform albedo; and
- an image source that provides the video image to the first image projector.

15. The multi-directional image displaying system of claim 14 further comprising a second image projector that projects the video image, the second projector being disposed with the housing.

16. The multi-directional image displaying system of claim 15, wherein the first image projector projects the video image towards a first portion of the distribution object and the second image projector projects the video image towards the second portion of the distribution object.

17. The multi-directional image displaying system of claim 14, wherein the position between first image projector and the distribution object or the shape of the distribution object can be adjusted to modify the display of the image.

* * * * *